Sept. 21, 1937.   A. L. WALLACE   2,093,987
METAL CUTTING TOOL
Filed Nov. 6, 1933   2 Sheets-Sheet 1
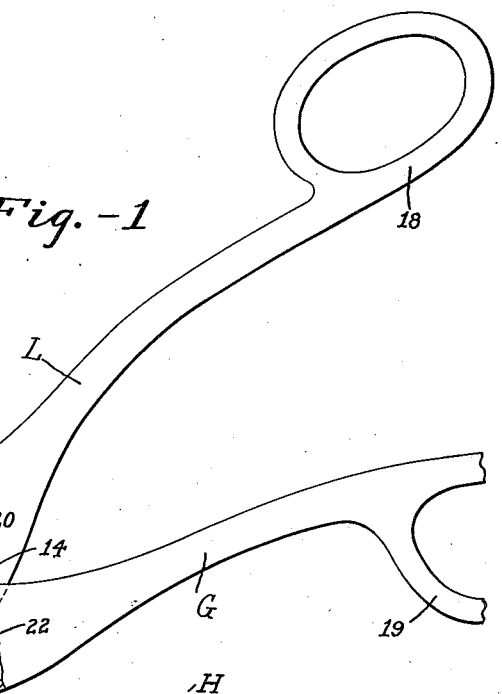
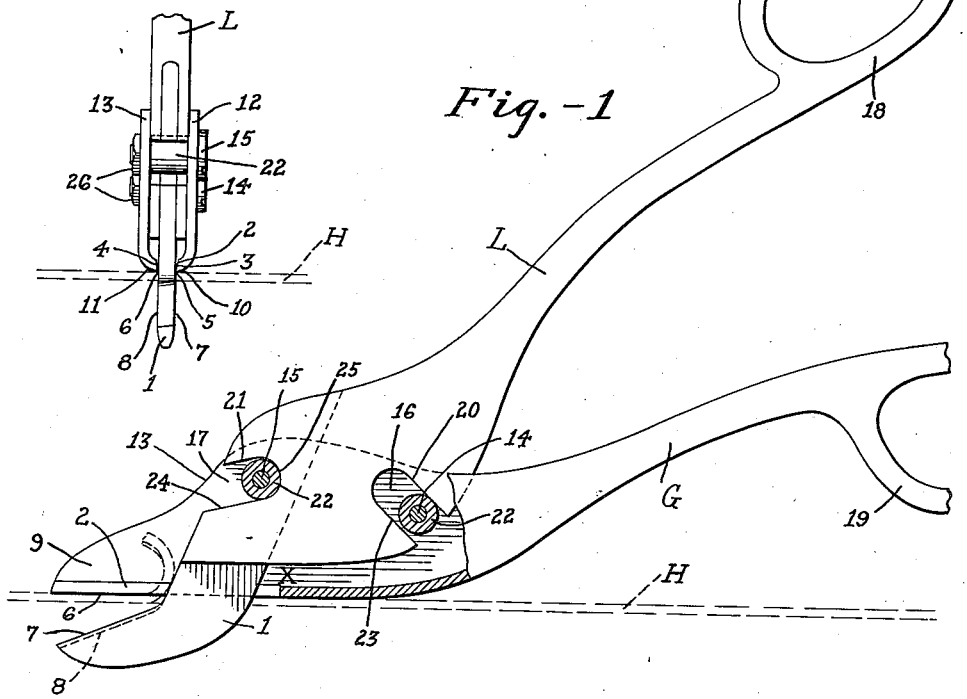
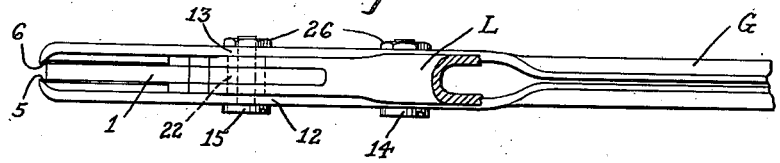
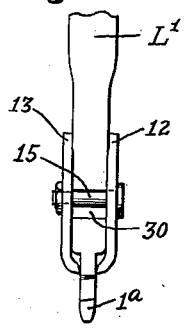
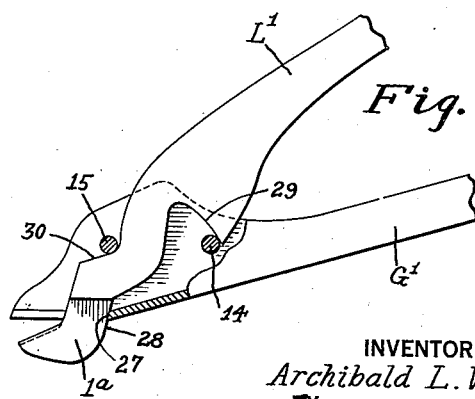
INVENTOR
Archibald L. Wallace
BY
ATTORNEY

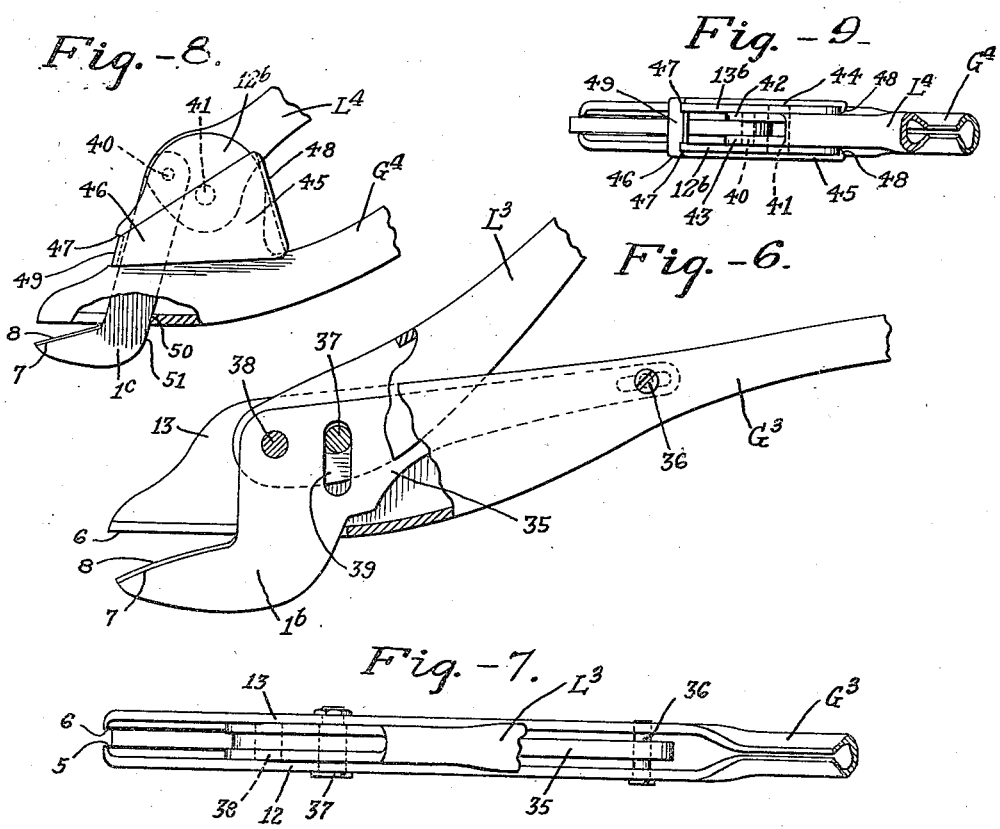

Patented Sept. 21, 1937

2,093,987

UNITED STATES PATENT OFFICE 2,093,987

METAL CUTTING TOOL

Archibald L. Wallace, Long Island, N. Y.

Application November 6, 1933, Serial No. 696,741

6 Claims. (Cl. 30—258)

This invention relates to a metal cutting tool, being in the nature of an improvement upon the invention disclosed in Patent No. 2,007,355, and an object of the invention is to provide a simple, practical, and efficient tool by the use of which sheet metal may be readily cut along lines either straight or curved as required.

A further object is to simplify and improve the construction and render it more practical both in manufacture and in use.

A more detailed object is to improve the action of the cutting jaw.

A further detailed object is to provide an improved hinge connection between the two lever members.

A further object is to provide a suitable tool for making marginal cuts.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:

Fig. 1 is a side elevational view, partly in section, illustrating a tool constructed in accordance with this invention.

Fig. 2 is a top plan view of the parts seen in Fig. 1.

Fig. 3 is an end view of the structure seen in Figs. 1 and 2.

Fig. 4 is a side elevational view, with a part broken away and shown in vertical section, and illustrating a modified form of hinge mounting between the two lever members.

Fig. 5 is an end view of the structure Fig. 4.

Fig. 6 is a view similar to Fig. 4 but illustrating a further modified form of hinge connection between the two lever members.

Fig. 7 is a top plan view of the structure seen in Fig. 6.

Fig. 8 is a side elevational view, with part broken away and shown in vertical section, showing a further modified form of hinge connection between the two levers, and Fig. 9 is a top plan view of the structure seen in Fig. 8.

Referring to the drawings for describing in detail the exemplary structures disclosed therein, and referring first to the structure Figs. 1 to 3, the reference characters L and G indicate two handle members or levers pivotally connected together so that the two handles may be manually operated by an operator's hand in the same manner as is common to the use of ordinary scissors or tin snips.

At its lower end the handle or lever L is formed with a rigidly connected cutter blade or jaw 1.

At its lower end the handle or lever G is formed with a slot 2 through which the blade or jaw 1 moves, the opposite walls as 3 and 4 of the slot providing cutting edges or corners as 5 and 6 co-operative with opposite edges or corners 7 and 8 respectively of the jaw 1 to enable the jaw to perform the cutting operation when the tool is in use in substantially the same manner as more fully set forth in the mentioned co-pending application.

In the present instance the jaw portion 9 of the lever G through which the slot 2 is formed is shown as being made up as a substantially integral portion of the lever G, said lever, including the jaw, being shown as formed from sheet metal bent into U cross section, and the slot being formed through the bottom wall or connecting portion of the U which is of semi-circular cross section so that the bottom wall surface portions as 10 and 11 adjacent to the cutting corners 5 and 6 curve upwardly from said corners thereby making said corners sufficiently sharp, and providing clearance between said portions 10 and 11 and the upper surface of the work, without any considerable amount of grinding of said surface portions 10 and 11.

The lever L is sandwiched between the spaced leg portions 12 and 13 of the lever G and is pivotally connected to said legs by means of two cross pins as 14 and 15 extending across the space between the legs and engaging respectively within slots 16 and 17 formed to receive them in the lever L.

It has been determined through experiments that by positioning the cross pins 14 and 15, and by giving lengthwise angular direction to the slots 16 and 17, in a certain relation to each other and to the cutting edges 5—7 and 6—8, substantially as indicated, said cutting edges may be made to more efficiently perform the cutting operation. The compound pivotal connection substantially as illustrated causes the blade or jaw 1 to retreat slightly with respect to the work when the hand grip portions 18 and 19 of the levers are swung together, thereby producing a slight sliding action of the cutting edges 7 and 8 of said blade along the work while cutting through the work, thus not only easing the cutting operation but at the same time tending to draw the work in, that is toward the operator's hand, and thus overcoming the natural tendency of the work to be cammed or wedged outwardly away from the operator's hand, when the jaws are squeezed together.

This retreating movement is due particularly to the inclined disposition of the slot 16, its upper wall surface 20 sliding backwardly as well as downwardly past the cross pin 14 when the handle 18 is swung down.

The slot 17 is shown as being inclined in a direction opposite to the inclination of the slot 16. Hence, when the lever L moves backwardly the upper wall surface 21 of slot 17 causes an upward movement of the jaw or blade 1 in addition to the upward swinging movement of said jaw. The upward swinging movement of the jaw 1 and the simultaneous upward movement of said jaw due to the inclination of wall 21 results in an actual movement of the cutting edges 7 and 8 of the jaw about a pivotal axis which continually changes during the upward movement but which lies in a general location substantially as indicated X on Fig. 1, that is a location somewhat lower down toward the work and nearer to the cutting edges of the jaw than either of the pivot pins 14 or 15, the location X being at a point where it would be a practical impossibility to erect a substantial single pivot joint, and said compound pivot at the same time being strong and powerful and producing the desirable rearward sliding movement of the cutting jaws as above referred to.

The cross pins 14 and 15 are preferably provided with sleeves thereon constituting anti-friction rollers as 22—22.

The relatively bottom wall surfaces as 23 and 24 of the slots 16 and 17 respectively co-operate with the cross pins to always hold the upper walls 20 and 21 of said slots in a properly fitting relationship to the cross pins at all times, and to prevent disconnection of the levers from each other.

The end wall as 25 of the slot 17 engages the cross pin 15, and the bottom wall 23 of slot 16 likewise engages the cross pin 14, to limit the opening movement of the levers. The closing movement of course is limited by engagement of the handle grip portions 18 and 19 with each other.

The cross pins 14 and 15 may be held in place by suitable retaining nuts or the like as 26 thereby enabling removal of said cross pins and the consequent disconnection of the two lever members L and G from each other whenever desired, as for instance for the making of repairs or for the substitution of a lever L having a different form of cutting blade 1.

The structure illustrated in Figs. 4 and 5 is substantially the same as above described, except that in Figs. 4 and 5 the lever G' provides a shoulder as 27 disposed to stand in constant engagement with the rear edge surface 28 of the cutter blade or jaw 1ª thereby to constitute a pivot point between the lever G and the cutter blade.

The lever L' in this instance, instead of being formed with slots as in the previous figures, is formed only with surfaces as 29 and 30 for engaging the cross pins 14 and 15 respectively so as to always maintain the rear edge 28 of the blade 1ª in pivotal engagement with the shoulder 27 during the opening and closing movements of the levers.

In the modification shown in Figs. 6 and 7 it is proposed that the cutter blade or jaw 1ᵇ shall be formed upon a member separate from the lever L³ and that said separate member, as indicated 35, shall have a sliding pivotal connection as at 36 with the lever G³ at a point suitably far backwardly from the cutting edges of the jaws so as to reduce the cam or wedge action of said jaws against the work during the cutting operation.

The jaw L³ is pivotally connected with the jaw G³ by a single pivot pin 37 and is pivotally connected with the member 35 by a separate pivot pin 38 having no connection with the jaw G³ but being spaced from the pivot 37 a suitably short distance so that closing movement of the lever L³ will operate to produce a powerful upward cutting movement of the blade or jaw 1ᵇ about the pivot 36 as will be readily understood from an inspection of Figs. 6 and 7.

The jaw G³ is of the same U-shaped cross section as shown and described with reference to Figs. 1 to 3.

The jaw L³ is of inverted U cross section, and the member 35 is sandwiched between the opposite depending legs of the lever L³, both the members L³ and 35 being sandwiched between the opposite legs of the lever G¹.

The member 35 is formed with a slot as 39 to enable it to move freely with respect to the pivot pin 37.

In the modification shown in Figs. 8 and 9 the cutter blade 1ᶜ is again shown as being formed as a separate element. In this instance it is shown as being pivotally connected as at 40 with the lever L⁴, the lever L⁴ being in turn pivotally connected as at 41 with the opposite upstanding walls 12ᵇ and 13ᵇ of the lever G⁴, the relationship of the pivots 40 and 41 being such that the closing movement of the lever L⁴ will move the pivot 40, and hence the cutter blade 1ᶜ upwardly for performing the cutting operation.

The pivot member 40 is a loose pin extending between spaced wall parts as 42 and 43 of the lever L⁴ and is held against unintentional displacement by being confined between the walls 12ᵇ and 13ᵇ of the lever G⁴.

The pivot member 41 is also a loose pin extending through the lever L⁴ and through the wall parts 12ᵇ and 13ᵇ of lever G but is held against unintentional displacement by being confined between the opposite legs as 44 and 45 of a separately formed U-shaped retainer member 46. The retainer 46 is fitted about the walls 12ᵇ and 13ᵇ, as indicated, and is held against displacement by frictional engagement with said walls. At its connecting portion it engages within a pair of notches as 47—47 formed in the walls 12ᵇ and 13ᵇ, and at the free ends of its legs said legs are turned inwardly to provide small retaining flanges thereon as 48—48 which engage portions of the walls 12ᵇ and 13ᵇ opposed to the notches 47.

So long as the retainer member is in position about the walls 12ᵇ and 13ᵇ, as indicated, it is impossible for the pivot pin 41 to move endwise, but upon removal of the retainer member said pivot pin 41 may be easily slid out so as to disconnect the levers L⁴ and G⁴, thereupon enabling similar endwise displacement of the pivot pin 40, thus to permit of the substitution of cutter blades of different forms suitable to different pieces of work, as may be necessary from time to time.

To remove the retainer member 46 it is simply necessary to swing the legs 44 and 45 thereof downwardly about the notches 47 as a pivot until said retainer member may be lifted off.

It is noted that the connecting portion as 49 of the retainer member 46 stands in position to oppose appreciable forward movement of the cutter blade 1c about the pivot 40 at all times during the use of the tool.

The lever G4 is formed with a shoulder 50, positioned to be engaged by the rear edge 51 of the cutter blade for limiting backward swinging movement of the blade about the pivot 40 during use.

In use this tool is intended to stand normally with the bottom edge surface of the lever G resting flat upon the upper surface of the work H, as clearly indicated in Fig. 1, the cutter blade 1 operating through the work to cut out a narrow ribbon from the work, corresponding with the thickness of the cutter blade, and following any line along the work either straight or curved as may be required.

With respect to the structure Fig. 1, it will be understood that the retreating movement of the jaw or blade 1 as above described may be modified in degree to any desired extent in different structures and is dependent upon the angle of inclination of the slots 16 and 17 with respect to each other and upon the position of said slots and their coacting cross pins 14 and 15 with respect to each other and to the point of contact between the jaws and the work. And it will also be understood that by the same means the movement of the jaw 1 may be modified in any desired way, whether to cause a retreating movement of the jaw 1 or otherwise, as preferred by the manufacturer.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A metal cutting tool comprising a pair of jaws pivotally connected together and adapted for cutting the metal by pivotal movement of said jaws, one of said jaws being of U cross section and having an open ended slot formed through the connecting portion of the U, and the other jaw being sandwiched between the legs of the U in pivotal connection with said legs and having a blade portion movable in said slot.

2. A metal cutting tool comprising a pair of jaws pivotally connected together and adapted for cutting the metal by pivotal movement of said jaws, one of said jaws being of U cross section and having a slot formed through the connecting portion of the U, a pair of pivots extending between the legs of the U spaced apart, and the other jaw being sandwiched between the legs of the U and being pivotally connected therewith by said spaced pivots and having a blade portion movable in said slot.

3. A metal cutting tool comprising a pair of jaws pivotally connected together and adapted for cutting the metal by pivotal movement of said jaws, one of said jaws being of U cross section and having a slot formed through the connecting portion of the U, a pair of pivots extending between the legs of the U spaced apart, and the other jaw being sandwiched between the legs of the U and having slots therein within which said pivots slidably engage respectively to thereby pivotally connect said jaws, and said second jaw having a blade portion movable in the slot of said first jaw.

4. A metal cutting tool comprising a pair of jaws pivotally connected together and adapted for cutting the metal by pivotal movement of said jaws, one of said jaws being of U cross section and having a slot formed through the connecting portion of the U, the other jaw being sandwiched between the legs of the U and being pivotally connected therewith and having a blade portion movable through said slot, and an operating lever for said second jaw also sandwiched between the legs of the first jaw, said operating lever being of inverted U cross section and having its legs straddling the second jaw and pivotally connected with the first jaw at one locality and pivotally connected with the second jaw at a locality spaced from the first pivot connection.

5. A metal cutting tool comprising a pair of jaws pivotally connected together and adapted for cutting the metal by pivotal movement of said jaws, one of said jaws being of U cross section and having a slot formed through the connecting portion of the U, the other jaw being sandwiched between the legs of the U and having a plurality of pivotal connections with said legs and having a blade portion movable in said slot, and said plurality of pivotal connections between said jaws changing progressively with relation to the jaws during the movement thereof.

6. A metal cutting tool comprising a pair of jaws pivotally connected together and adapted for cutting the metal by pivotal movement of said jaws, one of said jaws being of U cross section and having an open ended slot formed through the connecting portion of the U, and the other jaw being sandwiched between the legs of the U in pivotal connection with said legs and having a blade portion movable in said slot, the opposite side walls of the slot providing surfaces constituting the entire cutting edges against which co-operative edges of the blade engage to cut the metal during movement of the blade in the slot.

ARCHIBALD L. WALLACE.